United States Patent [19]
Daly

[11] Patent Number: 5,394,483
[45] Date of Patent: Feb. 28, 1995

[54] METHOD AND APPARATUS FOR DETERMINING VISUALLY PERCEPTIBLE DIFFERENCES BETWEEN IMAGES

[76] Inventor: Scott J. Daly, 1758 Scottsville-Mumford Rd., Scottsville, N.Y. 14546

[21] Appl. No.: 906,603

[22] Filed: Jun. 30, 1992

[51] Int. Cl.[6] .............................................. G06K 9/00
[52] U.S. Cl. .................................. 382/34; 382/30; 382/50
[58] Field of Search .................. 382/30, 34, 54, 61, 382/69, 50; 358/133, 135, 136; 364/413.13, 413.23, 413.22

[56] References Cited

U.S. PATENT DOCUMENTS

| | | | |
|---|---|---|---|
| 4,494,838 | 1/1985 | Wallquist et al. | 382/52 |
| 4,589,022 | 5/1986 | Prince et al. | 358/166 |
| 4,777,620 | 10/1988 | Shimoni et al. | |
| 4,797,742 | 1/1989 | Sugiyama et al. | 358/135 |
| 4,805,017 | 2/1989 | Kaneko et al. | |
| 4,809,350 | 2/1989 | Shimoni et al. | |
| 4,811,112 | 3/1989 | Rutledge et al. | |
| 4,849,810 | 7/1989 | Ericsson. | |
| 4,851,906 | 7/1989 | Koga et al. | |
| 4,851,984 | 7/1989 | Doi et al. | 364/413.23 |
| 4,884,131 | 11/1989 | Chevion et al. | |
| 4,894,713 | 1/1990 | Delogne et al. | 358/135 |
| 4,953,024 | 8/1990 | Caronna. | |
| 4,979,222 | 12/1990 | Weber | 382/30 |
| 5,001,560 | 3/1991 | Ericsson. | |
| 5,020,123 | 5/1991 | Thompson. | |
| 5,079,621 | 1/1992 | Daly et al. | 358/138 |
| 5,136,377 | 8/1992 | Johnston et al. | 358/136 |

OTHER PUBLICATIONS

David L. McLaren, D. Nguyen, "Removal of Subjective Redundancy from DCT-coded Images", Oct. 1991.
P. Seitz, G. Lang, "A Practical Adaptive Image Compression . . . " 1990.
K. Ngan, K. Leong, H. Singh, "Adaptive Cosine Transform Coding of Images in Perceptual Domain", 1989.

Primary Examiner—Stephen Chin
Assistant Examiner—Timothy J. May

[57] ABSTRACT

Visual differences between a first and second image are determined by first modifying the first and second image signals to model non-linear response to luminance in cone receptors of an eye, modifying the first and second image signals to compensate for both optical properties of the eyes and neural interaction between cells in a retina, adjusting sensitivity to image differences to model the ability of the human visual system to discern features in an image, and comparing the first and second image signals based on the adjusted sensitivity. An output based on this comparison is provided in the form of either an in-context map having first and second colors superimposed on one of the images to moderate differences or in the form of a free-form map having light and dark pixels thereon indicating differences.

9 Claims, 5 Drawing Sheets

METHOD AND APPARATUS FOR DETERMINING VISUALLY PERCEPTIBLE DIFFERENCES BETWEEN IMAGES

FIELD OF THE INVENTION

This invention relates to the field of image processing and more particularly to the field of image quality assessment.

BACKGROUND OF THE INVENTION

It is desirable to be able to quantify the amount of distortion of an image that is perceptible to a human. Such quantification provides a tool for designing imaging systems, image compression schemes, and imaging media. A designer can trade-off the cost of reducing image distortion with the degree of human perceptibility of that distortion.

Most algorithms for determining image distortion output a single numerical value that indicates an amount of distortion. While providing a single value simplifies the trade-off process, it does not indicate which portions of the image are distorted. In some instances, it may be desirable to increase distortions in some areas of an image while simultaneously decreasing distortions in other areas.

Further, many algorithms, especially those that provide a single value, do not distinguish between different types of distortion. For example, some algorithms cannot distinguish between a first image and a second image where the second image has less blur but more noise than the first image. The images are not the same, but the algorithms rate them the same.

There is a need for a method and apparatus which determine the visual differences between images and provide a visual indication of these differences.

SUMMARY OF THE INVENTION

According to the present invention, a first image signal and a second image signal are compared by modifying the first and second image signals to model nonlinear response to the luminance in cone receptors of an eye, modifying the first and second image signals to compensate for optical properties of the eye and neural interactions between cells in a retina, adjusting sensitivity to image differences to model the human visual system's ability to discern features in an image, and comparing the first and second image signals based on the adjusted sensitivity.

According further to the present invention, visual differences between a first image signal and a second image signal are determined by adjusting luminance of the first and second images, determining visual sensitivity of the images as a function of frequency, breaking up each of the first and second image signals into a plurality of cortex-filtered image signals which vary according to visual orientation and frequency content of image information, providing image signals indicative of the difference between the cortex-filtered first and second image signals at a plurality of visual orientation and frequency band combinations of the cortex filters, determining the visual sensitivity of the images according to the frequency and orientation of information in the image signal, determining an overall threshold according to a threshold elevation associated with the first image and a threshold elevation according to the second image, and determining the probability that a user will perceive a difference between the first image and the second image.

According further to the present invention, determining visual differences between a first image signal and a second image signal includes providing an image having pixels of one type at locations wherein no perceptible differences between the first and second images are detected and having darker or lighter pixels at locations wherein the first image is predicted to be perceived as darker or lighter, respectively, than the second image.

According further to the present invention, determining visual differences between a first image signal and a second image signal includes providing the first image signal with first and second colors superimposed thereon at locations wherein the first image is predicted to be perceived as darker or lighter than the second image.

According further to the present invention, determining visual differences between a first image signal and a second image signal includes determining visual sensitivity as a function of digital frequency for a plurality of incremental distances within a range of distances and deeming said overall visual sensitivity as a function of digital frequency equal to the maximum sensitivity value for each pixel.

According further to the present invention, determining visual differences between a first image signal and a second image signal includes low pass filtering a threshold elevation signal in order to remove phase dependency therefrom.

According further to the present invention, determining visual differences between a first image signal and a second image signal includes adjusting the sensitivity as a function of frequency.

According further to the present invention, determining visual differences between a first image signal and a second image signal includes setting a threshold elevation to the minimum of the sensitivities of the first and second images.

The present invention determines perceptible distortion for a range of viewing distances. It also provides a two dimensional output, corresponding to the input images, which provides a visual indication to a user of these locations where differences between two images would be perceived by a human observer. Further, the present invention models the human visual system and is therefore a good predictor of perceptible differences between images.

Quantifying perceptible visual differences between two images can have many applications. The design of imaging media, image compression schemes, or imaging systems is facilitated by being able to trade-off the cost of improving image quality with the amount of the improvement that would be visually perceptible. Another use is in the calibration and testing of imaging equipment where the decision to replace components or make adjustments is based on the amount of the perceptible differences between the ideal and the actual output of the equipment. Still another use is for the design of camouflage wherein an image signal having the camouflaged apparatus therein is compared to an image signal not having the camouflaged apparatus therein. The absence of any visually perceptible differences indicates effective camouflage.

Other advantages and novel features of the present invention will become apparent from the following detailed description of the invention when considered in conjunction with the accompanying drawings.

DESCRIPTION OF THE PREFERRED EMBODIMENTS

Figure 1:
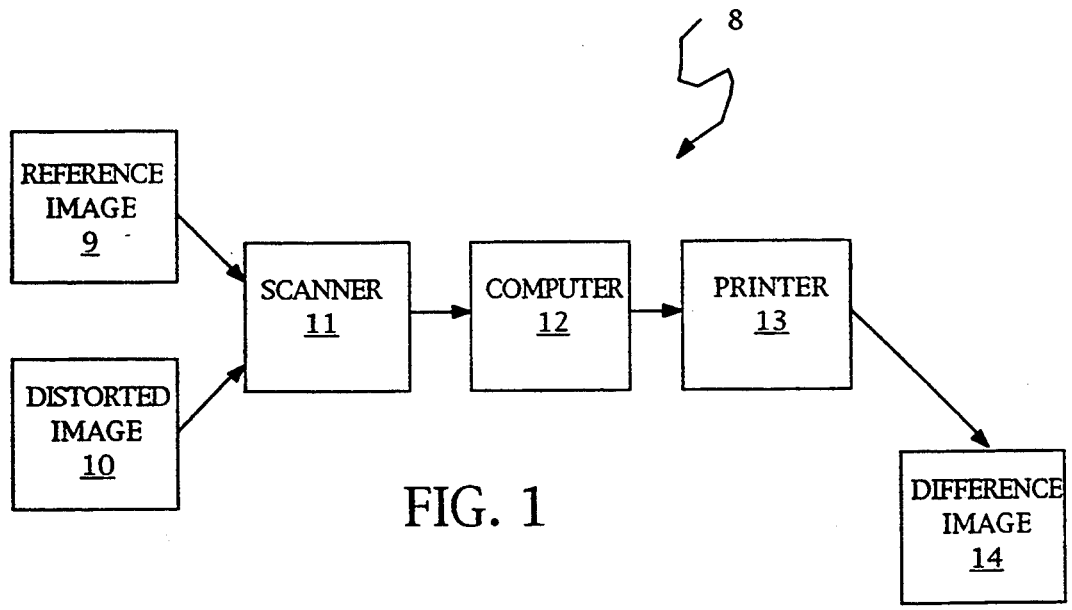
FIG. 1 is an overall block diagram illustrating a system constructed in accordance with an embodiment of the present invention for determining perceptible visual differences between two images.

Referring to FIG. 1, a system 8 for determining visual differences between a first image 9 and a second image 10 comprises a scanner 11, a computer 12, and a printer 13. The printer 12 can also be a soft copy display or other appropriate output device. The images 9, 10 are scanned in one at a time by the scanner 11, which provides digital signals indicative of the scanned images 9, 10 to the computer 12. The computer 12 can be a special purpose computer or dedicated chip set or other appropriate hardware. The computer 12 computes visual differences between the images 9, 10 and provides an image signal to the printer 13 that is indicative of the visual differences between the images 9, 10. The printer 13 outputs a differences image 14 which visually indicates the differences between the images 9, 10. The differences image 14 can take on many forms, as described in detail hereinafter. Each of these individual components 11-13 of the system 8 described above can be conventional in their hardware design in this embodiment of the invention.

Figure 2:
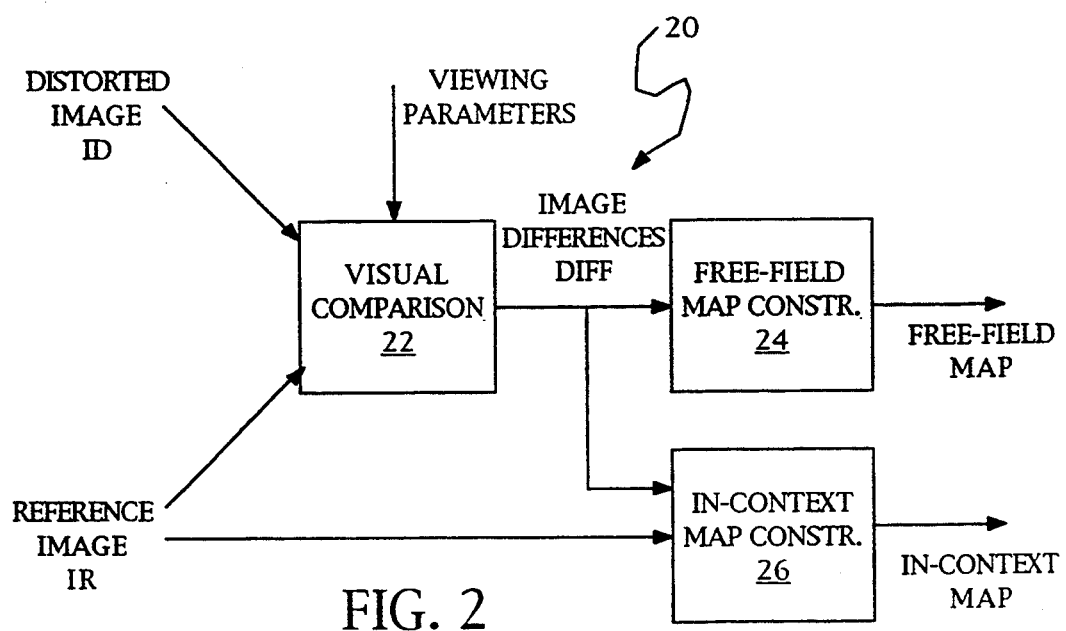
FIG. 2 is a functional block diagram illustrating operation of a portion of a system constructed in accordance with an embodiment of the present invention for determining perceptible visual differences between two images.

FIG. 2 is a functional block diagram 20 illustrating operation of an algorithm within the computer 12 for determining perceptible visual differences between two images. The diagram 20 has boxes and arrows, with the arrows representing signals and being annotated with signal names. The boxes on the diagram 20 represent functional units for processing the signals. Unless otherwise indicated, implementation of the functionality represented by the units is straightforward for one skilled in the art and can be implemented with appropriate computer software. An example of the functionality of each of the units will be described below, the actual software or hardware used to implement a particular function being straightforward to one of ordinary skill in the art. No portion of the diagram 20 is meant to necessarily convey any temporal relationship between the units.

A reference image signal, IR, a distorted image signal, ID, and a viewing parameters signal are input to a visual comparison unit 22. The reference and distorted image signals are digital data files that correspond to the images 9, 10 of FIG. 1. Although the images 9, 10 of FIG. 1 are shown being scanned and converted into digital images, it will be appreciated by one skilled in the art that the system can operate on digital images derived by any means from any source.

The visual comparison unit 22 compares the images and outputs a signal indicative of the visually perceptible differences between the reference and distorted image signals. For certain uses of the system, the distorted image signal will be the reference image signal with undesirable noise added thereto. However, for other uses, it is possible that the distorted image is not distorted in the sense that that term is normally used in the art. Rather, the distorted image is merely different than the reference image. In that case, the terms "reference" and "distorted" do not take on their usual meaning.

The viewing parameters signal includes a specified range of viewing distances of the images, the light adaptation level (the level of background illumination), the field-of-view, pixel spacing, size of the image, and eccentricity. These viewing parameters are independent of the images being analyzed. The viewing parameters are provided by a system designer to indicate the physical conditions under which the designer expects a user to be viewing the images.

The visual comparison unit 22 compares the images and provides, as an output signal an image differences signal which indicates visual differences perceptible by a human observer under conditions indicated by the viewing parameters signal.

The image differences signal is provided to a free-field map construction unit 24, which outputs a free-field map image signal to the printer 13. The free-field map image is a digital image having gray pixels at locations where the visual comparison unit 22 predicts that a user will not perceive a difference between the reference image and the distorted image. Pixels in the free-field map that are lighter than gray indicate that the visual comparison unit 22 predicts that a human will perceive that the distorted image is lighter than the reference image at the positions of the lighter pixels. Similarly, pixels in the free-field map that are darker than gray indicate that the visual comparison unit 22 predicts that a human will perceive that the distorted image is darker than the reference image at the positions of the darker pixels. The degree of lightness or darkness of the pixels indicates the estimated probability of detection by a user.

The image differences signal and the reference image signal are provided to an in-context map construction unit 26. The in-context map construction unit 26 provides an in-context map image signal, which is an image signal showing the monochromatic reference image with color superimposed on the reference image to indicate the pixel positions where the visual comparison unit 22 predicts a user will notice differences between the distorted image and the reference image. One color indicates that the user will see the distorted image as darker than the reference image while another color indicates that the user will see the distorted image as lighter than the reference image.

Figure 3:
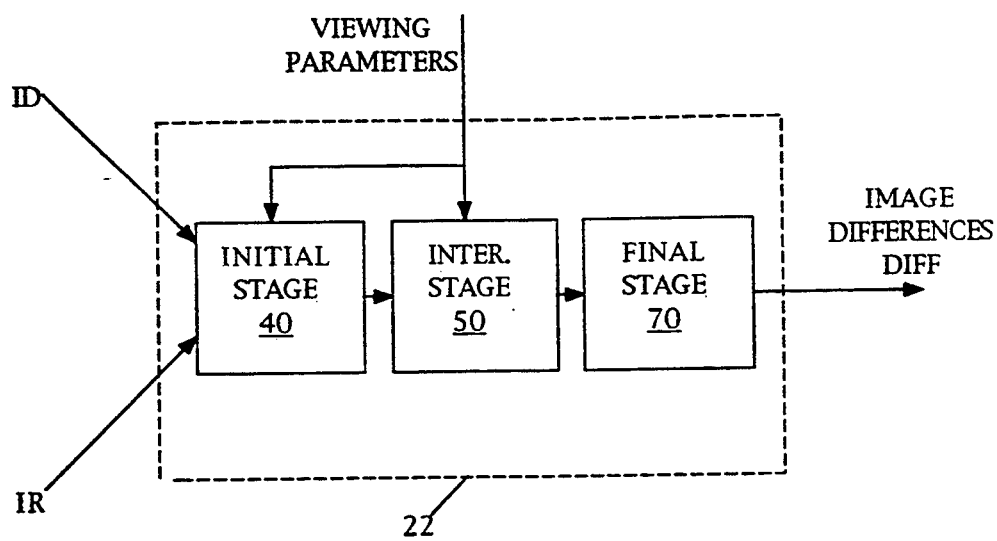
FIG. 3 is a functional block diagram illustrating in greater detail operation of a portion of a system constructed in accordance with an embodiment of the present invention for determining perceptible visual differences between two images.

Referring to FIG. 3, a functional block diagram illustrates in greater detail operation of the visual comparison unit 22. The unit 22 comprises an initial stage 40, which processes (modifies) each of the distorted images and reference images separately and then selectively extracts information from each image to provide a plurality of images. Following the initial stage is a middle stage 50, where the plurality of images corresponding to the distorted image are compared to the plurality of images corresponding to the reference image to provide a plurality of probability images. These probability images are two-dimensional arrays that are indicative of the probability that a user will notice a difference between the reference image and the distorted image. Following the middle stage 50 is a final stage 70 where the plurality of probability images are combined into a single image and then provided as an output in a selected manner.

Figure 4:
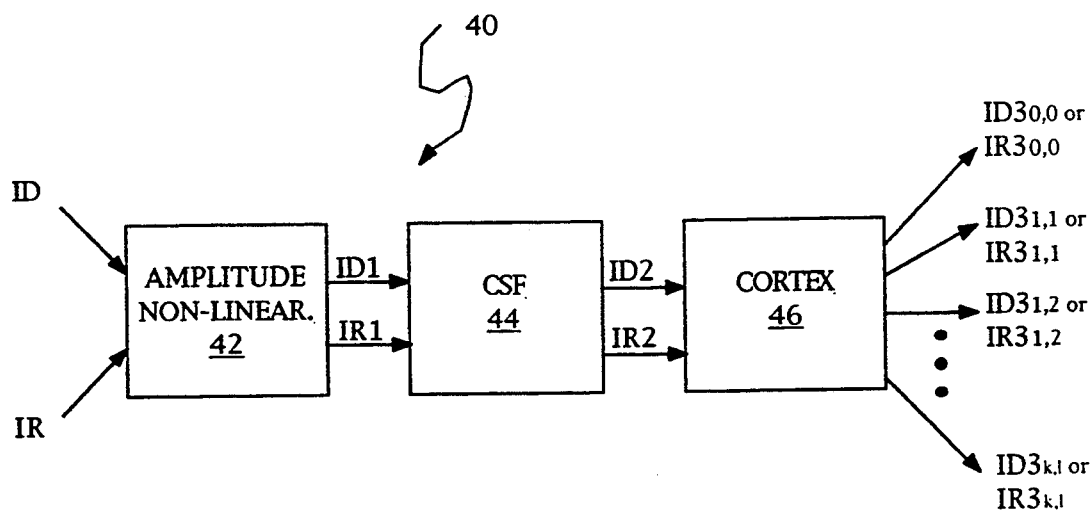
FIG. 4 is a functional block diagram illustrating operation of an initial stage of a system constructed in accordance with an embodiment of the present invention for determining perceptible visual differences between two images.

Referring to FIG. 4, a functional block diagram illustrates in more detail an embodiment of the operation of the initial stage 40 of comparison unit 22. The initial stage 40 processes the reference image and the distorted image separately. Accordingly, the signals on the diagram 40 labeled IRxx or IDxx refer to the reference image signal and the distorted image signal, respectively. Since the reference and distorted signals are processed separately, neither signal affects the other in the initial stage 40.

Processing of the images begins at an amplitude non-linearity unit 42, where non-linear response to the luminance of each pixel on the cone receptors of the eye is modeled. This modeling could be accomplished in a number of ways. In an exemplary embodiment of this invention, this modeling is performed by adjusting the luminance level of the reference and distorted image signals. This can be done by scaling each of the image pixels by the following amount:

$$1/(Ix[i,j] + (c1 \cdot Ix[i,j])^b)$$

where Ix[i, j] represents the value of luminance (in $cd/m^2$) of a pixel at location i,j in either the image IR or the image ID. The value of cl is a constant equal to 12.6, and b is a constant equal to 0.63. The output of the unit 42 is indicated as image signal IR1 or ID1 on the diagram 40. The above equation and values of constants are exemplary only and there are a number of possible alternative methods and values one could use instead of the equation illustrated above. However, one of ordinary skill in the art needs only to program a computer with this equation and constants in order to provide the modeling of non-linear effects.

The signals IR1 and ID1 are input to a CSF unit 44 where IR1 and ID1 are processed by a contrast sensitivity function (CSF) to become IR2 and ID2. The contrast sensitivity function describes variations in visual sensitivity as a function of spatial frequency. This sensitivity is due primarily to the optical properties of the eye and neural interactions between cells in the retina.

In an exemplary embodiment of the present invention, the contrast sensitivity function, CSF, is described by the equation:

$$CSF(\rho,\phi,l,a,d,e,\eta) = \frac{P_a P_\lambda}{\sqrt{\left(\frac{1}{S(\rho,\phi,l,a,d,e)}\right)^2 + W^2\eta}}$$

where $\rho$ is the magnitude of the frequency in cycles/degree, and $\phi$ is the direction of frequency orientation in units of angular degrees.

The following values are provided by the designer as viewing parameters, as discussed earlier. The value l is the light adaptation level in candelas/meter-squared, a is the area of the image in degrees-squared, d is the distance of the image from the viewer in meters, e is the eccentricity of the image in degrees, and $\eta$ is the white noise level in units of $deg^2$ per $cycles^2$.

W is the signal to noise ratio for detection, which for this particular embodiment of the invention, is selected to be 6.0. For this exemplary embodiment of the invention, the value of $\eta$ is deemed to be zero. However, it is possible to determine the CSF for non-zero $\eta$. The value $\eta$ can be determined, for example, by the method disclosed in a 1990 paper by the present inventor which appeared on pages 977–987 of volume 29 of *Optical Engineering*, titled "Application of Noise Adaptive Contrast Sensitivity Function to Image Data Compression."

The constant $P_a$ represents the absolute peak sensitivity of the CSF and for the illustrated embodiment of the invention is set to 250. The constant $P_\lambda$ is a normalizing factor and is set to 1.0 for the illustrated embodiment of the invention.

The equation above is used to calculate a plurality of numerical values for the CSF at a plurality of values for $\rho$ and $\phi$. Initially, the CSF is computed in terms of a plurality of values for u and v, Cartesian vectors that can be used alternatively to $\rho$ and $\phi$. The values of u and v are each made to range from zero to half the number of pixels, in increments of 1, in the horizontal and vertical directions, respectively. Then, u and v are scaled to account for the pixel spacing and then converted to polar coordinates where:

$$\rho = \sqrt{u^2 + v^2}$$

and $$\phi = \text{Arctan}\left(\frac{v}{u}\right).$$

The details of converting the CSF from a Cartesian representation to a polar representation can be found in U.S. Pat. No. 4,780,761 to Daly titled "Digital Image Compression and Transmission System Visually Weighted Transform Coefficients", which is incorporated by reference herein.

The equation above for the CSF describes an exemplary embodiment which modifies the reference and distorted image signals to compensate for the optical properties of the eye and neural interactions between cells in the retina. This equation is easily programmed into the computer 12 by one of ordinary skill in the art.

Furthermore, it should be understood that this equation represents only one method of accounting for the optical properties of the eye, with other methods being possible.

Evaluation of the CSF function requires evaluation of the function S. The function S can be expressed as:

$$S(\rho,\phi,l,a,d,e) = \min\left[S2\left(\frac{\rho}{bw_a \cdot bw_e \cdot bw_\phi}, l, a\right), S2(\rho,l,a)\right]$$

S is the minimum of the function S2 evaluated with two sets of arguments. Note that in the above equation, the second and third arguments to S2 are both l and a. The argument l represents the light adaptation level of the image. For a photographic print, this would be the incident light striking the image. For a CRT display, this would be the level of light emanating from the brightest point on the screen. The area of the image, a, is expressed in units of visual degrees-squared, the product of the number of degrees in a human field of vision taken up by the image in the vertical direction and the number of degrees in the horizontal direction.

The first argument to the S2 function in the above equation accounts for changes in frequency bandwidth due to the effects of angle of orientation, $\phi$, the eccentricity of the image, e, and the distance, d, between the image and the person viewing the image. The eccentricity of the image, e, is the off normal angle of the image from the human observer. The $bw_e$ term equals $1/(1+k.e)$, where, for this embodiment of the invention, k equals 0.24. If the eccentricity e is zero (i.e. the image is viewed straight-on) then $bw_e$ equals one.

The following equation is used to determine $bw_a$:

$$bw_a = 0.856 \cdot d^{0.14}$$

And the following equation is used to determine $bw_\phi$:

$$bw_\phi = ((1-ob)/2)\cos(4\phi) + (1+ob)/2$$

where, for the presently illustrated exemplary embodiment of the invention, ob equals 0.7.

The function S2 is defined by the following equation:

$$S2(\rho,l,a) = ((3.23(\rho^2 a)^{-0.3})^5 + 1)^{-\frac{1}{5}} \cdot A_l \rho e^{-B_l \rho} \sqrt{1 + 0.6 e^{B_l \rho}}$$

where, for the presently illustrated embodiment of the invention, $A_l$ equals $0.801(1+0.7/l)^{-0.2}$ and $B_l$ equals $0.3(1+100/l)^{0.15}$.

The above equation is exemplary only and there are a number of alternative methods one could use instead of the equation illustrated above.

In an embodiment of the invention, the CSF unit 44 determines the contrast sensitivity over a range of viewing distances. The overall contrast sensitivity for a range of viewing distances, CSF_RANGE, is determined by calculating the CSF for the minimum viewing distance, the maximum viewing distance, and for a number of incremental distances therebetween. This will result in a plurality of incremental CSF's: $CSF_1$, $CSF_2$. . . $CSF_n$, each being the result of calculating the CSF for a particular distance. The overall CSF for the range of distances, CSF_RANGE, is the maximum sensitivity for each pixel (i.e. the maximum value of $CFS_n[i,j]$) for all of the incremental CSF images. In other words, for every i and j, CSF_RANGE[i,j] equals the maximum value of $CSF_n[i,j]$ for all values of n.

The CSF unit 44 of FIG. 4 applies the contrast sensitivity function to the IR1 and ID1 image signals to produce the IR2 and ID2 image signals so that:

$$ID2 = ID1 * CSF\_RANGE$$

and $$IR2 = IR1 * CSF\_RANGE$$

Note that for the above operations, and, by analogy, for any subsequent filter operations illustrated herein, IR1 * CSF_RANGE and ID1 * CSF_RANGE can be performed by either multiplying IR1 or ID1 and the CSF_RANGE in the frequency domain or by convolving IR1 or ID1 and a space domain version of the CSF_RANGE in the space domain. The choice of how to perform the operation is a design choice based on a variety of functional factors known to one skilled in the art.

The image signals IR2 and ID2 represent the reference and distorted image signals after they have been modified once to account for the non-linear effects in the cone receptors of the human eye, and a second time to compensate for the optical properties of the eye and the neural interactions between cells in the retina. The thus modified signals IR2 and ID2 are now modified a third time, by cortex filters, which adjust the signals so as to model the human visual system's ability to discern a particular feature in an image as a function of the orientation and the frequency content of both the feature and of the surrounding image.

The cortex filters account for the tendency of humans to be less sensitive to noise in an image as the amount of image information increases. Noise in a cluttered image is less noticeable than noise in a relatively uncluttered image. Each of the cortex filters extracts information from an image which varies according to a particular frequency and orientation combination.

A cortex unit 46 subdivides the image signals IR2 and ID2, using a plurality of cortex filters, into one of a plurality of images $IR30_{0,0}$ or $ID30_{0,0}$, $IR3_{1,1}$ or $ID3_{1,1}$, $IR3_{1,2}$ or $ID3_{1,2}$, $IR3_{1,3}$ or $ID3_{1,3}$ . . . $IR3_{k,L}$ or $ID3_{k,L}$. The only image having either the first or the second subscript equal to zero are the baseband images $IR30_{0,0}$ and $ID30_{0,0}$. The cortex filters represent a model of the human visual system where the ability to discern a particular feature in an image is a function of both the orientation and the frequency spectrum content of both the feature and of the surrounding image. If an image is cluttered, distortion is less discernible.

Each of the images $IR3_{k,l}$ or $ID3_{k,l}$ represents the IR2 or ID2 image filtered in a kth radial frequency band and having a lth orientation, as described in more detail hereinafter. Frequency of the image is measured in cycles/pixel. The $IR3_{0,0}$ or $ID3_{0,0}$ image is the baseband image and represents the portion of the IR2 or ID2 image at DC and very low frequencies for all orientations. The description of these filters, and an exemplary implementation, are described below.

For the embodiment of the invention described herein, there are five radial frequency bands and a baseband. The bands have associated therewith a lower half-amplitude frequency and an upper half-amplitude frequency, designated by H. The upper half-amplitude frequency equals $2^{-k}$ and the lower half-amplitude frequency equals $2^{-(k+1)}$ where k is the band number. The half-amplitude frequencies are the frequencies at which the magnitude of the filter output is one half of the magnitude of the peak amplitude.

Also associated with each of the bands is an upper and lower transition width, designated as tw, which indicates the radial frequency range required for the filter to transition from minimum to maximum amplitude or vise versa. For each of the bands, tw=2H/3, where H is either the upper or lower half-amplitude frequency associated with each of the bands.

For the baseband image, $I3_{0,0}$, the frequency filter is given by the equation:

$$\text{baseband}(\rho) = e^{-(\frac{\rho^2}{2\sigma^2})}\bigg|_{\rho < H + \frac{tw}{2}}$$

$$\text{baseband}(\rho) = 0.0\big|_{\rho > H + \frac{tw}{2}}$$

where $\rho$ is the frequency, H is $2^{-(\text{number of frequency bands})}$ (i.e. 1/32 for this embodiment of the invention), and $\sigma$ is a constant given by:

$$\sigma = \frac{1}{3}\left(H + \frac{tw}{2}\right)$$

For the remainder of the frequency bands, frequency filtering is performed using what are known as "dom" filters. Each dom filter, in turn, is constructed from filters called mesa filters. A mesa filter is described by the equations:

$$\text{mesa}(\rho) = 1.0\big|_{\rho < H - \frac{tw}{2}}$$

$$\text{mesa}(\rho) = \frac{1}{2}\left(1 + \cos\left(\frac{\pi\left(\rho - H + \frac{tw}{2}\right)}{tw}\right)\right)\bigg|_{H - \frac{tw}{2} < \rho < H + \frac{tw}{2}}$$

$$\text{mesa}(\rho) = 0.0\big|_{\rho > H + \frac{tw}{2}}$$

A dom filter, used for frequency filtering, is then described by the equation:

$$dom_k(\rho) = mesa(\rho)\big|_{H=2-(k-1)} - mesa(\rho)\big|_{H=2-k}$$

Note that the highest frequency band at k=1 can contain radial frequencies higher than 0.5 cycles/pixel. This can occur in an image at visual orientations other than 0, 90, 180, or 270 degrees.

For the frequency band adjacent to the baseband (i.e. for k=number of frequency bands minus one), the dom filter is described by the equation:

$$dom_k(\rho) = mesa(\rho)\big|_{H=2-(k-1)} - baseband(\rho)$$

Because the embodiment of the invention described uses five frequency bands plus the baseband, the dom filter adjacent to the baseband is at k=5 and has a lower cutoff frequency of 1/32.

While dom filters are used for frequency filtering, "fan" filters are used for filtering the image based on the angular orientation of components of the image. The general equation to describe the fan filters is:

$$fan_l(\phi) = \frac{1}{2}\left(1 + \cos\left(\frac{\pi|\phi - \phi_c(l)|}{\phi_{tw}}\right)\right)\bigg|_{|\phi - \phi_c(l)| \leq \phi_{tw}}$$

$$fan_l(\phi) = 0.0\big|_{|\phi - \phi_c(l)| > \phi_{tw}}$$

where 1 is a designation of the particular orientation (i.e. 1 equals one to the number of orientations), $\phi$ is the angle of orientation of a pixel in the filter plane, $\phi_{tw}$ is the transition width of each of the fan filters (i.e. 180/(number of fan filters)), and $\phi_c(l)$ is the midpoint angle of fan filter 1.

$\phi_c(l)$ can be determined by the following equation:

$$\phi_c(l) = (l-1) \cdot \phi_{tw} - 90$$

The dom filters and the fan filters are easily implementable by one of ordinary skill in the art, given the equations set forth above. These filters are exemplary only, with other filtering methods for modeling the response of the human cortex being possible.

A cortex filter for each of the bands (except the baseband) is a combination of a dom filter and a fan filter, and is described by:

$$cortex_{k,l}(\rho,\phi) = dom_k(\rho) \cdot fan_l(\phi)$$

For the baseband, the cortex filter is described by:

$$cortex_{k,l}(\rho,\phi) = baseband(\rho)$$

Note that the above equation illustrates that the baseband filter is orientation independent.

In a manner similar to that described thoroughly for the CSF, above, the cortex filters are calculated for a plurality of $\rho$'s and $\phi$'s by first representing the value of the cortex filter in terms of Cartesian coordinates u and v and then converting the Cartesian coordinate representations to polar coordinate representations.

For the current embodiment, there are six bands of visual orientation, each encompassing sixty degrees. Therefore, one baseband plus five frequency bands and six orientation bands provides thirty-one IR3 or ID3 images that are output by the cortex unit 46. The value of k can take on values from one to five (the number of frequency bands) and the value 1 can take on values from one to six (the number of orientations).

Each of the images $I3_{k,l}$ is determined by the following:

$$IR3_{k,l} = cortex_{k,l}(\rho,\phi) * IR2$$

and $$ID3_{k,l} = cortex_{k,l}(\rho,\phi) * ID2$$

The above two equations represent the operation of the cortex unit 46 of FIG. 4. The cortex unit 46 essentially extracts image information selectively from the IR2 or ID2 image according to the frequency and orientation of the information in the IR2 or ID2 image. Each of the thirty-one $IR3_{k,1}$ or $ID3_{k,1}$ images represents a different portion of the selectively extracted information.

Figures 5, 6:
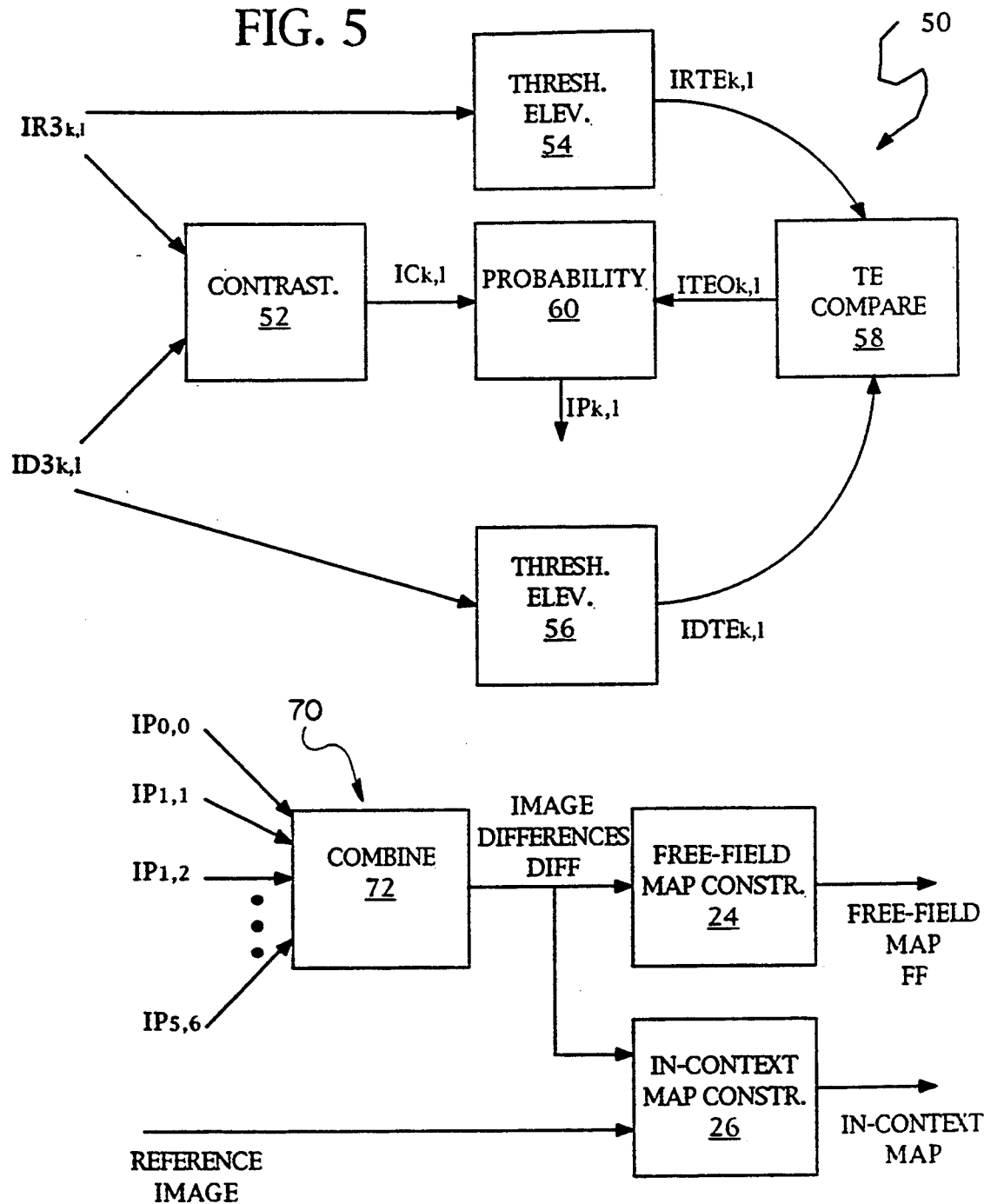
FIG. 5 is a functional block diagram illustrating operation of a middle stage of a system constructed in accordance with an embodiment of the present invention for determining perceptible visual differences between two images.
FIG. 6 is a functional block diagram illustrating a combiner stage of a system constructed in accordance with an embodiment of the present invention for determining perceptible visual differences between two images.

Referring to FIG. 5, a functional block diagram illustrates the intermediate stage 50 for further processing performed on all thirty-one cortex-filtered images derived from the reference image, denoted by $IR3_{k,\iota}$ and all thirty-one cortex-filtered images derived from the distorted image, denoted by $ID3_{k,\iota}$. For each k and l, the reference and distorted images are operated upon to provide as an output thirty-one separate probability images, denoted by $IP_{k,\iota}$, wherein the probability images are estimates of the probability of a human perceiving a difference between the reference image and the distorted image for any point in the image.

In the intermediate stage 50, the reference image signal $I3R_{k,\iota}$ and the distorted image signal $I3D_{k,\iota}$ are subtracted at a contrast unit 52 to produce a contrast image, denoted by $IC_{k,\iota}$, using the following equation:

$$IC_{k,\iota}[i,j] = (IR_{k,\iota}[i,j] - ID_{k,\iota}[i,j])/GC$$

where i and j indicate the pixel position, k and l indicate the particular cortex filter used to filter the input images, and GC represents a global contrast calibration value, which is related to the lightness level of the entire image. For the particular embodiment of the invention illustrated herein, global contrast is not used so GC is set to one. The above equation is easily implemented by one of ordinary skill in the art.

The $IC_{k,\iota}$ images represent the actual, mathematical, differences between the reference image and the distorted image on a per cortex-filtered image basis. If the reference image and the distorted image are exactly the same at a particular pixel for a particular cortex band, then the value of the output contrast image at that pixel will be zero.

A first threshold elevation image signal, denoted by $IRTE_{k,\iota}$, is calculated at a threshold elevation unit 54. A second threshold elevation image signal, denoted by $IDTE_{k,\iota}$, is calculated at a threshold elevation unit 56. The threshold elevation units 54, 56 may be distinct or may be the same software or hardware being operated at different times.

The threshold elevation images, $IRTE_{k,\iota}$ and $IDTE_{k,\iota}$, accounts for the reduction in sensitivity of a user to components of image distortion having a particular orientation at a particular frequency. In other words, when an image contains information having a particular frequency and orientation, distortions that approach that same frequency and orientation are less likely to be observable than distortions at a frequency and orientation different than that of the image information.

The increase in the threshold according to the frequency and orientation of information in the images has been observed and measured experimentally. The following equation is an approximation of the expected increase in the threshold for an average person. This equation is used in the threshold elevation units 54 and 56, and is easily implemented by one of ordinary skill in the art.

$$IxTE_{k,\iota}[i,j] = (1 + (c1 \ (c2|Ix3_{k,\iota}[i,j]|)^y)^b)^{\frac{1}{b}}$$

where $I \times 3$ represents either IR or ID and i, j indicates a particular pixel.

In an exemplary embodiment, the value of b is 4.0. The quantity "s" equals 0.7 for the baseband image, 0.8 for images filtered through cortex filters having the two highest frequencies (i.e. k equal one or two), and 1.0 for all other images. Other methods of elevating the thresholds are possible, the equation and parameters set forth above illustrating merely one of these possible embodiments.

The value of "s" indicates the amount of "learning" of the algorithm, where learning is a term of art and indicates the degree to which the algorithm can discern noise from actual image information. A lower value of "s" indicates a higher amount of learning and hence a higher threshold in the context of noise.

The quantities c1 and c2 are psychophysically related quantities and can be expressed as:

$$c1 = W^{(\frac{1}{1-Q})}$$

$$c2 = W^{(1-\frac{1}{1-Q})}$$

where, for the particular embodiment of the invention illustrated herein, $W = 6.0$ and $Q = 0.7$.

The above equation and values are exemplary only and there are a number of possible alternative methods one could use instead of the equation illustrated above.

The image signals $IRTE_{k,\iota}$ and $IDTE_{k,\iota}$ are provided as inputs to a threshold elevation comparison unit 58, which compares low-pass filtered versions of the input signals to provide an overall threshold image signal, designated as $ITEO_{k,\iota}$. The following equation illustrates this process:

$$ITEO_{k,\iota}[i,j] = min(LP(IRTE_{k,\iota}[i,j]), LP(IDTE_{k,\iota}[i,j]))$$

where LP indicates that the IRTE and IDTE images have been low-pass filtered to remove phase uncertainty. The low pass filtering is performed using the mesa filters from the cortex filtering step, described above. An $IxTE_{k,\iota}$ image is filtered using the kth mesa filter.

"Phase uncertainty" is a term of art relating to the fact that the sensitivity threshold determination used to derive IRTE and IDTE is phase dependent. The quantities which represent IRTE and IDTE are a function of phase. Experiments have determined that human visual perception, on the other hand, is predominately phase insensitive within each cortex filtered image. The low pass filter in the above equation is used therefore to filter out the phase dependence of the values of IRTE and IDTE.

Determining the overall threshold, $ITEO_{k,\iota}$, by taking the minimum of $IRTE_{k,\iota}$ and $IDTE_{k,\iota}$ has the effect of setting the threshold to the minimum threshold of the two images rather than the threshold of the reference image. This is done because some types of noise, such as blur, are very noticeable while still being below the threshold of a reference image having a relatively high information content.

The $ITEO_{k,\iota}$ and $IC_{k,\iota}$ image signals are provided as inputs to a probability generator unit 60, which, for each pixel in each of the thirty-one cortex-filtered distortion images and thirty-one cortex filtered reference images, determines the probability that a user will detect a difference between the reference image and the distorted image. As an exemplary embodiment, the probabilities are stored as two dimensional probability images denoted by $IP_{k,\iota}$. The probability generator unit of the present invention uses the following equation:

$$IP_{k,\iota}[i,j] = 1 - e^{-(IC_{k,\iota[i,j]}/ITEO_{k,\iota}[i,j])\beta}$$

where $\beta$ equals 3.5.

The above equation is exemplary only and there are a number of possible alternative methods one could use, instead of the equation illustrated above, in order to determine the probability. However, this equation is easily implemented by one of ordinary skill in the art.

Referring to FIG. 6, a functional block diagram illustrates the final stage 70 of the perceptible visual differences comparison system including a combination unit 72. A probability combination unit 72 combines the thirty-one $IP_{k,\iota}$ images into an image differences signal where each pixel indicates the probability that an observer will detect a difference between the reference image signal and the distorted image signal at that pixel.

In an exemplary embodiment of the invention, combination is performed by first multiplying one minus all thirty-one probabilities for each pixel, i.e. $IP_k,i,j]$, for all i and j, and then subtracting that product from one. The sign of the probability of detection for each pixel is set to the sign of the sum of all thirty one $IC_{k,\iota}[i,j]$ pixels. The implementation of this combining process is easy for one of ordinary skill in the art given the procedure described immediately above. Note that, as discussed above, the sign indicates whether the user will perceive a pixel of the distorted image as either lighter or darker than the reference image.

The image differences signal, DIFF[i,j], is provided to the free-field map construction unit 24 which constructs a free-field map image signal indicative of the perceptible differences between the distorted image and the reference image. This signal is provided from the computer 12 to the printer 13. When the free-field map image signal is printed or otherwise displayed, gray portions of the image indicate that no perceptible differences exist between the reference image and the distorted image. Dark portions indicate that the distorted image is likely to be perceived as darker than the reference image. Similarly, light portions indicate that the distorted image is likely to be perceived as lighter than the reference image. The degree of darkness or lightness indicates the calculated relative probability of detection.

If the image differences sign is denoted as DIFF[i,j], the free-field map image signal, FF[i,j], is determined by the following equation:

$$FF[i,j] = DIFF[i,j] \cdot (max-min)/2 + (max+min)/2$$

where max and min are the maximum and minimum values for pixels in the particular display media being used.

The image differences signal, DIFF[i,j], can also be provided to an in-context map construction unit 26, which overlays on the monochromatic reference image a color signal indicative of the perceptible distortion. The method is nearly identical to that described above for the free-field map except, instead of modulating a gray tone, the in-context map will modulate two colors, one indicating darkness and one indicating lightness. The colors will be superimposed on the monochromatic reference image signal, so that a user can see on the original reference image where the perceptible distortion occurs.

Figure 7:
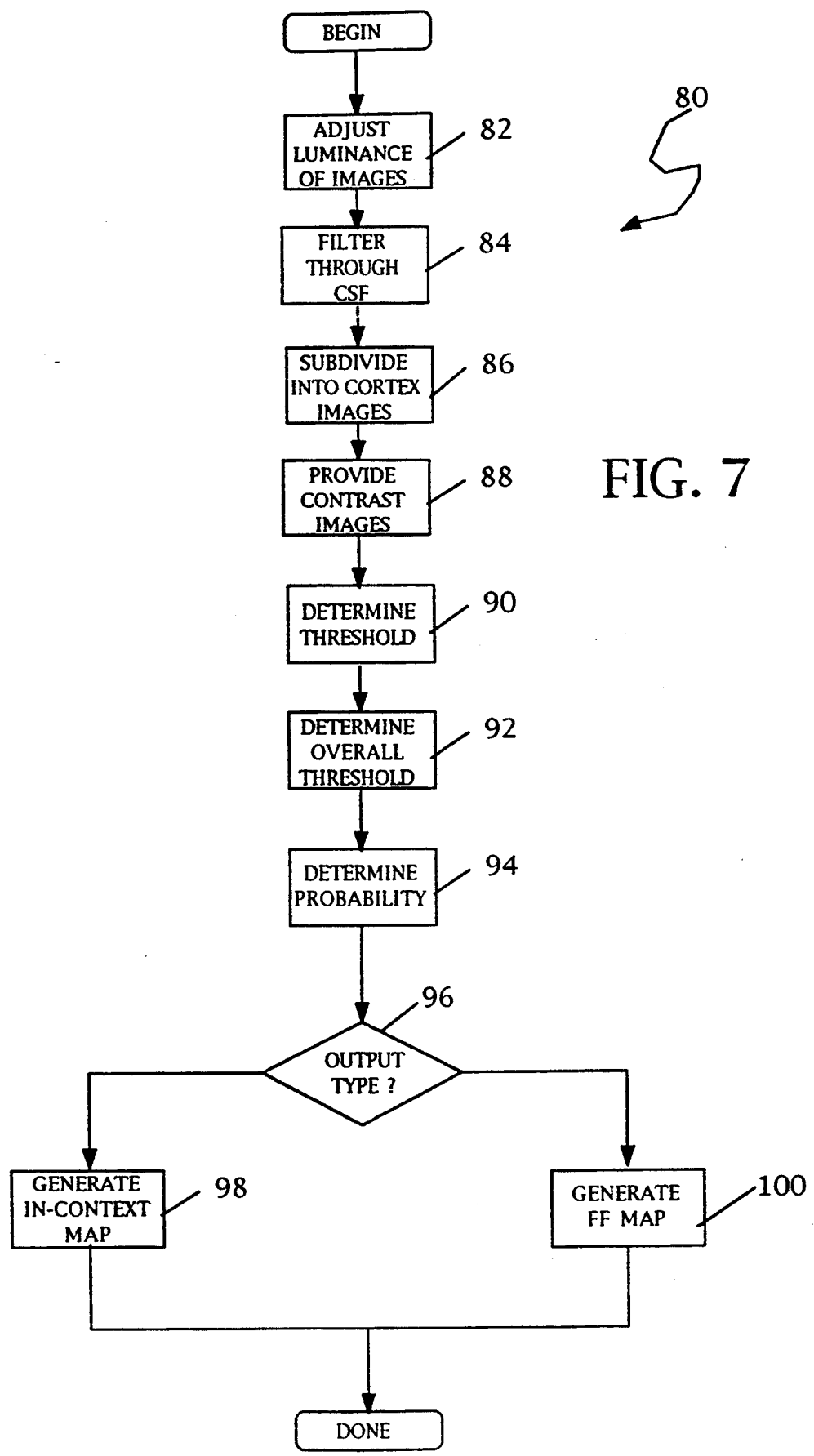
FIG. 7 is a flowchart for illustrating operation of a system constructed in accordance with an embodiment of the present invention for determining visual differences between two images.

FIG. 7 illustrates a flowchart 80 depicting an embodiment of the operation of a system for determining visual differences between a first image and a second image. The details of each of the steps have already been described above. At a first step 82, the luminance of the images is adjusted to compensate for the non-linear effects of luminance of each pixel on the cone receptors of the eye.

In a step 84, each of the images is filtered through the contrast sensitivity function. The contrast sensitivity function models the effects of optical properties of the eye and neural interactions between cells in the retina.

Each of the images is broken up in a step 86 into a plurality of cortex-filtered images. A cortex-filtered image is an array of pixels representative of information in the image having a particular orientation and frequency content.

In a step 88, the cortex filtered images associated with the reference image are compared to the cortex-filtered images associated with the distorted image to provide a plurality of contrast difference images. The contrast difference images represent the mathematical differences between the images on a pixel-by-pixel basis.

In a step 90, the cortex-filtered images associated with the reference image and the cortex-filtered images associated with the distorted image are used to determine the threshold elevation. The threshold elevations represent the decrease in sensitivity to noise due to the image content.

In a step 92, the thresholds for the reference and distorted images, determined in the step 90, are low pass filtered and then combined into a single set of threshold elevations.

The overall thresholds from the step 92 and the contrast difference images from the step 88 are used in a step 94 to determine the probability that a user will notice a difference between the reference image and the distorted image. The probability is based on the magnitude of the difference (from the step 88) and on the value of the overall threshold (from the step 92). The output provided from the step 94 is a single array where each element represents the probability, on a per pixel basis, that a user will notice a difference between the reference and distorted images.

Following the step 94 is a decision step 96 where a determination is made as to the type of output desired. If an in-context map is desired, control passes from the step 96 to a step 98, where the in-context map is generated in a manner described in more detail, above. The in-context map shows the reference image with a first and second color superimposed at locations thereon, where the first color indicates that the user is likely to perceive the distorted image as darker than the reference image and the second color indicates that the user is likely to perceive the distorted image as lighter than the reference image.

Control can also pass from the step 96 to a step 100, where a free-field map is generated in a manner described in more detail, above. The free-field map is an image having gray pixels at locations where a prediction is made that a user will not perceive a difference between the distorted and reference images. The free-field image also has darker or lighter pixels where the distorted image is predicted to be perceived as darker or lighter, respectively, than the reference image.

Figure 8:
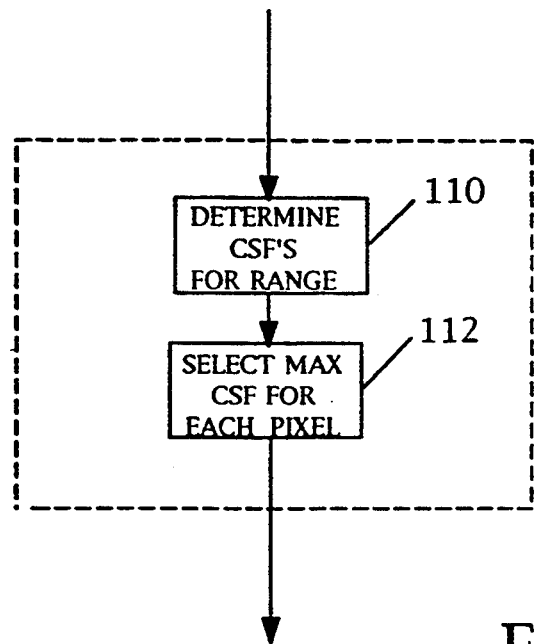
FIG. 8 is a flow chart for illustrating in detail generating a contrast sensitivity function for a range of viewing distances.

Referring to FIG. 8, the contrast sensitivity filter from the step 84 can be represented in greater detail by two steps 110, 112. At the first step 110, the contrast sensitivity functions (CSF) for a plurality of distances including a closest distance, a farthest distance, and incremental distances therebetween are determined in the manner already described. In the step 112, the overall CSF for an image is determined by choosing the maximum value, on a per-pixel basis, from each of the CSF's calculated in the step 110.

Figure 9:
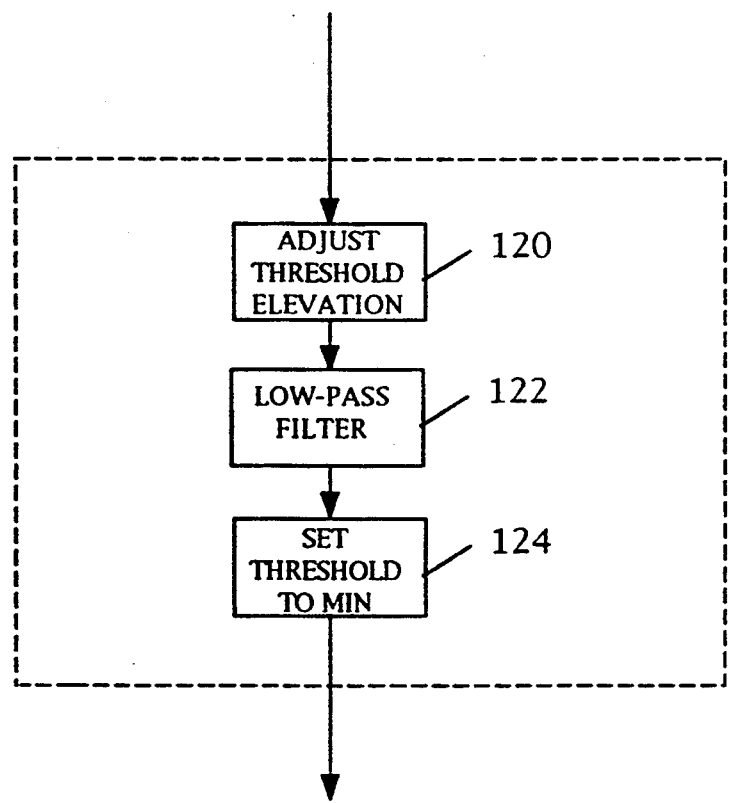
FIG. 9 is a flowchart for illustrating in detail determining the threshold and the overall threshold for two images.

Referring to FIG. 9, the steps of determining the threshold 90 and determining the overall threshold 92 can be illustrated in more detail by three steps 120, 122, 124. At the step 120, the thresholds for the reference and distorted images are adjusted as a function of frequency and location, as described earlier. In the step 122, the thresholds are separately low-pass filtered using, for example, the mesa filters. The overall threshold is then determined in step the 124 by selecting, on a per pixel basis, the minimum threshold value for the low-pass filtered thresholds from the step 122.

Although the invention has been illustrated herein using specific equations for the amplitude non-linearity adjustment, the contrast sensitivity filter, and the cortex filters, one skilled in the art could make adjustments to the equations, constants used therein, function domains, etc. without departing from the spirit and scope of the invention. Similarly the invention may be practiced using different numbers of dom and/or fan filters for the cortex filters.

Even though the invention has been shown outputting a free-field map or an in-context map, it will be appreciated by one skilled in the art that other types or forms of output may be used without departing from the spirit and scope of the invention.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. Apparatus for determining visual differences, to the human visual system of an observer, between a first image signal representative of a first image and having a first luminance level and a second image signal representative of a second image and having a second luminance level, comprising:

an amplitude non-linearity unit, which is operative to adjust said first and second luminance levels of the first and second image signals, respectively;

a contrast sensitivity unit, which is coupled to the output of said amplitude non-linearity unit, and is operative to determine variations in visual sensitivity of said first and second images as a function of frequency;

a cortex unit, which is coupled to the output of said contrast sensitivity unit, and is operative to subdivide each of said first and second image signals into a plurality of cortex-filtered image signals which vary according to visual orientation of said first and second images relative to said human visual system of said observer and frequency content of image information;

a contrast difference unit, which is coupled to the output of said cortex unit, and is operative to provide image signals indicative of the difference between said cortex-filtered first and second image signals at a plurality of visual orientation and frequency band combinations of said cortex filters;

a first threshold elevation unit, which is coupled to receive a plurality of cortex-filtered first image signals from said cortext unit, and is operative to determine the visual sensitivity of first cortex-filtered images according to the frequency and orientation of information in the first image signal;

a second threshold elevation unit, which is coupled to receive a plurality of cortex-filtered second image signals from said cortext unit, and is operative to determine the visual sensitivity of second cortex-filtered images according to the frequency and orientation of information in the second image signal;

a threshold elevation comparison unit, which is coupled to the outputs of said first and second threshold elevation units, and is operative to determine an overall threshold according to first threshold elevations associated with said first plurality of cortex-filtered images and second threshold elevations associated with said second plurality of cortex-filtered images; and a probability generator unit, which is coupled to the output of aid contrast unit and the output of said threshold elevation comparison unit, and is operative to determine the probability that a user will visually perceive a difference between the first image and the second image.

2. Apparatus for determining visual differences between a first image signal and a second image signal, according to claim 1, further comprising:

a free-field map generator unit, for providing an image having gray pixels at locations wherein no perceptible differences between the first and second images are detected and having darker or lighter pixels at locations wherein the first image is predicted to be perceived as darker or lighter, respectively, than the second image.

3. Apparatus for determining visual differences between a first image signal and a second image signal, according to claim 1, further comprising:

an in-context map generator unit, for outputting the first image signal with a first and second color superimposed thereon at locations wherein the first image is predicted to be perceived as darker or lighter, respectively, than the second image.

4. Apparatus for determining visual differences between a first image signal and a second image signal, according to claim 1, wherein said cortex filter unit employs mesa filters defined by the function:

$$\text{mesa}(\rho) = 1.0|_{\rho < H - \frac{tw}{2}}$$

$$\text{mesa}(\rho) = \frac{1}{2}\left(1 + \cos\left(\frac{\pi\left(\rho - H + \frac{tw}{2}\right)}{tw}\right)\right)\Bigg|_{H - \frac{tw}{2} < \rho < H + \frac{tw}{2}}$$

$$\text{mesa}(\rho) = 0.0|_{\rho > H + \frac{tw}{2}}$$

where $\rho$ represents frequency, tw represents transition width of a frequency band, and H represents a half-amplitude frequency.

5. Apparatus for determining visual differences between a first image signal and a second image signal, according to claim 4, wherein said cortex filter unit employs fan filters defined by the function:

$$fan_1(\phi) = \frac{1}{2}\left(1 + \cos\left(\frac{\pi|\phi - \phi_c(l)|}{\phi_{tw}}\right)\right)\bigg|_{|\phi-\phi_c(l)| \leq \phi_{tw}}$$

$$fan_1(\phi) = 0.0\big|_{|\phi-\phi_c(l)| > \phi_{tw}}$$

where 1 is a designation of the particular orientation, $\phi$ is the angle of orientation, $\phi_{tw}$ is the width of each of the fan filters, and $\phi_c(l)$ is the midpoint angle of fan filter 1.

6. Apparatus for determining visual differences between a first image signal and a second image signal, according to claim 5, wherein said cortex filter unit employs a baseband filter defined by the function:

$$baseband\ (\rho) = e^{-\left(\frac{\rho^2}{2\sigma^2}\right)}\bigg|_{\rho < H + \frac{tw}{2}}$$

$$baseband\ (\rho) = 0.0\big|_{\rho > H + \frac{tw}{2}}$$

where $\rho$ is the frequency, H is $2^{-(number\ of\ frequency\ bands)}$, and $\sigma$ is a constant given by:

$$\sigma = \frac{1}{3}\left(H + \frac{tw}{2}\right).$$

7. Apparatus for determining visual differences between a first image signal and a second image signal, according to claim 7, wherein said cortex filter unit retains radial frequencies greater than 0.5 cycles per pixel.

8. Apparatus for determining visual differences between a first image signal and a second image signal, according to claim 1, wherein said threshold elevation unit is defined by the function:

$$IxTE_{k,l}[i,j] = (1 + (c1\ (c2|Ix_{k,l}[i,j]|)^s)^b)^{\frac{1}{b}}$$

where Ix represents either the first image or the second image, i, j indicate a particular pixel, the value of b is 4.0, the quantity s equals 0.7 for the baseband image, 0.8 for images filtered through cortex filters having the two highest frequencies and 1.0 for all other images.

9. A method of processing first and second digital images, each of said first and second digital images being comprised of a respective array of pixels, and having differences therebetween that are visually perceptible to a human observer, in order to selectively extract from each digital image a plurality of digital images comprising the steps of:

(a) for each of said first and second digital images, modeling a non-linear response of cone receptors of the human eye to the luminance of each pixel of said each first and second digital image, to produce a respective non-linear response digital image;

(b) processing each respective non-linear response digital image produced in step (a) in accordance with a contrast sensitivity function representative of variations in visual sensitivity as a function of spatial frequency, to produce a respective contrast sensitivity function digital image; and (c) processing each respective contrast sensitivity function digital image produced in step (b) in accordance with a cortex filter operator which is operative to adjust said each contrast sensitivity function digital image as a function of orientation and frequency content of a prescribed image feature and surrounding image content, so as to derive a plurality of digital images associated with respectively different frequency bands and orientations.

* * * * *

UNITED STATES PATENT OFFICE
CERTIFICATE OF CORRECTION

PATENT NO. : 5,394,483
DATED : February 28, 1995
INVENTOR(S) : Scott J. Daly

It is certified that error appears in the above–identified patent and that said Letters Patent is hereby corrected as shown below:

On cover page, insert, item [73] Assignee, —Eastman Kodak Company—

Column 16, line 25 (claim 1), "aid" should read --said--.

Signed and Sealed this

Eighteenth Day of July, 1995

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,394,483
DATED : 2/28/95
INVENTOR(S) : Scott J. Daly

It is certified that error appears in the above-indentified patent and that said Letters Patent is hereby corrected as shown below:

On the title page, item [76] Inventor: Please delete the Inventor's home address --1758 Scottsville-Mumford Rd.,--.

Signed and Sealed this

Seventeenth Day of October, 1995

Attest:

BRUCE LEHMAN

Attesting Officer     Commissioner of Patents and Trademarks